United States Patent  [15] 3,640,091
Buller et al.  [45] Feb. 8, 1972

[54] VALVE ARRANGEMENT TO PROVIDE TEMPERATURE LEVEL CONTROL AT CRYOGENIC TEMPERATURE RANGES

[72] Inventors: Joseph S. Buller; Michael J. Nagy; Eugene W. Peterson, all of Santa Barbara, Calif.

[73] Assignee: Santa Barbara Research Center, Goleta, Calif.

[22] Filed: May 13, 1969

[21] Appl. No.: 824,177

[52] U.S. Cl. ............................................................. 62/514
[51] Int. Cl. .......................................................... F25b 19/00
[58] Field of Search ........................................... 62/222, 514

[56] References Cited

UNITED STATES PATENTS

| | | | |
|---|---|---|---|
| 3,320,755 | 5/1967 | Jepsen | 62/514 |
| 3,413,819 | 12/1968 | Hansen | 62/514 X |
| 3,457,730 | 7/1969 | Berry | 62/514 X |

*Primary Examiner*—Meyer Perlin
*Attorney*—James K. Haskell and Allen A. Dicke, Jr.

[57] ABSTRACT

A cryostat assembly is provided having a finned cryogen delivery tube spirally surrounding an internal cylinder. The terminating end of the tube is sealed and a cryogen escape port is located adjacent a detector heat load. The central cylinder contains a bellows arrangement having sealed therein the cryogen utilized in the delivery tube, or other suitable fluid. The bellows has attached thereto a needlepointed element having its needlepoint in operative relationship with the escape port in the delivery tube. Spring means normally bias the element to bring the needlepoint into closed relationship with the port. As ambient temperature varies, the fluid within the bellows expands and contracts, moving the needlepoint into and out of sealing relationship with the port thereby accomplishing bleeding feed of the cryogen from the delivery tube, the expansion of which into the lower pressured area induces cooling of the detector by virtue of what is known as the Joule-Thomson effect.

3 Claims, 4 Drawing Figures

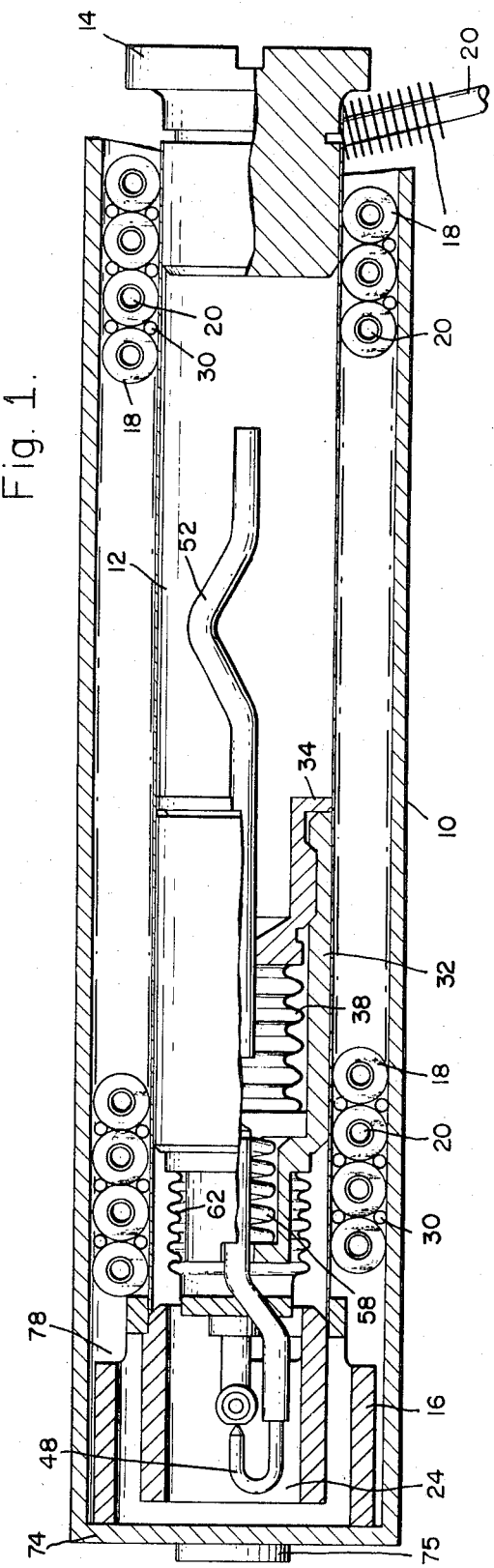

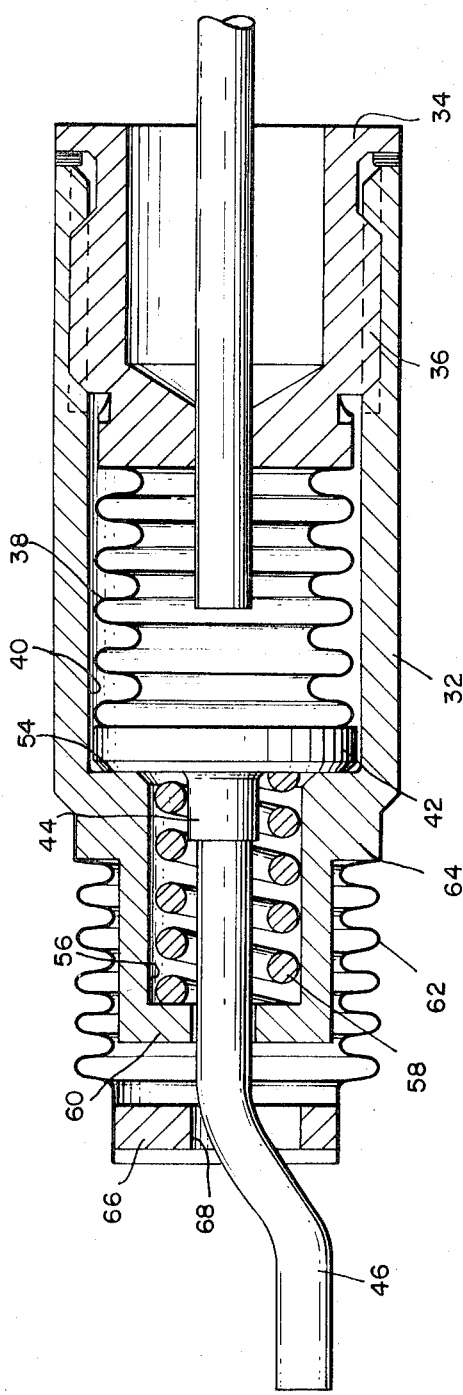
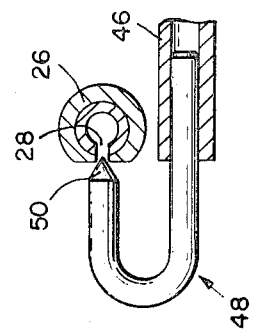
Fig. 3.
Fig. 2
J. Stanley Buller,
Michael J. Nagy,
Eugene W. Peterson,
INVENTORS.
ATTORNEY.

VALVE ARRANGEMENT TO PROVIDE TEMPERATURE LEVEL CONTROL AT CRYOGENIC TEMPERATURE RANGES

BACKGROUND

The invention relates to a valve arrangement to accomplish the regulated bleeding flow of a pressurized cryogenic fluid into an area of lower pressure and thereby achieve temperature control by virtue of the cooling Joule-Thomson effect at the point of the expanding cryogenic fluid.

In recent years many devices have been developed which detect electrical magnetic radiation in many areas of the spectrum. Particular attention has been given to the development of detectors which provide an output signal when radiation in the infrared invisible areas of the spectrum is received thereby. Characteristically, these detectors function most efficiently when they are cooled to cryogenic temperatures, for example, 77° Kelvin. Rapid and efficient cooling of the detector is, of course, desirable. One inservice application of such infrared detectors is used as a guidance sensor on a missile which is intended to seek and destroy IR-emitting aircraft rockets and the like. Of course, this is not the only inservice application of such detectors as it is well known that such detectors are employed in night viewing devices, terrain scanning devices, as, for example, from a synchronous satellite, and other applications. In any event, the detectors characteristically operate more efficiently when cooled to cryogenic temperatures. One mode of cooling the detectors to low-temperature levels is to provide a source of cryogenic fluid such as argon or nitrogen under comparatively high pressure and bleed the cryogenic fluid into an expansion area adjacent the detector heat load, the expansion thereof inducing cooling thereof by virtue of the Joule-Thomson effect.

One prior art mode of accomplishing this bleeding flow was to have the pressurized fluid or gas container in operative series relationship with a constant pressure outlet valve which bled the cryogen at a pressure lower than the stored pressure. While cooling was induced by this construction, this mode offered no opportunity for accurate control of the gas flow as required by changes in heat load or operating efficiency due to such variables as the surrounding ambient temperature or clogging of the cryostat with frozen impurities. A considerable excess flow was required to assure operation. Additionally, this mode of cooling would cease to operate when the pressure in the container reached the pressure level of the regulating valve, thus wasting the cryogen that remained in the container so that long term cooling was not a feature of this mode of operation. The biggest objection is that expansion of gas from tank pressure to regulated pressure in the regulator performs no useful cooling. Any system reaches a minimum pressure for operation, which minimum running pressure is lower for larger orifices which unfortunately are less efficient at high pressure.

Another prior art method of providing the cooling required in detector applications is a bleeding valve arrangement as disclosed in U.S. Pat. No. 3,269,140, dated Aug. 30, 1966. The structure disclosed in the patent attempted to remedy the defects of the earlier noted modes of cooling by providing a bellows arrangement which would expand and contract with variation in ambient temperature and move the open end of a delivery tube into and out of engagement with a pointed poppet element, which, by virtue of said movement, sealed or opened the noted open ended delivery tube. A particular disadvantage of this arrangement found to have existed in practice was that it does not direct the expandable gas directly at the detector to be cooled, and does not satisfy those applications requiring quick cooling.

SUMMARY

In order to aid in the understanding of this invention, it can be stated in essentially summary form that it is directed to a temperature control valve in a cryostat which is served by a pressurized cryogen delivery tube. The delivery tube has a Joule-Thomson expansion orifice in the side thereof which directs expanding cryogen at a cold wall of the cryostat. A valve member operates in conjunction with the expansion orifice to control the flow therethrough. Bellows is positioned interiorly of the cryostat and contains a cryogen. The bellows expands against a stop at room temperature and has a spring urging the movable part of the bellows away from the stop. When operating temperature is reached, the movable part of the bellows moves away from the stop to move the valve member to control flow out of the orifice.

Accordingly, it is a primary purpose of the invention to provide an improved bleeding-type cryogenic valve arrangement which will bleed a pressurized cryogen to a low-pressure area to achieve rapid cooling in that area by virtue of the Joule-Thomson effect and accomplish such cooling and cryogen fluid bleeding in an efficient, effective manner to maintain a determined ambient temperature condition and do so over an extended period of time as compared to prior art structures. The cryogen flow is so controlled that it impinges directly on the structure to be cooled to achieve rapid cooldown.

These and other features of the invention will become apparent in the course of the following description and from an examination of the related drawings.

BRIEF DESCRIPTION OF THE DRAWINGS

FIG. 1 is a central vertical sectional view of a presently preferred embodiment of the invention, FIG. 1a is a fragmentary, detail view of a forward aspect of FIG. 1, FIG. 2 is a fragmentary view taken at the circled arrow 2—2 of FIG. 1, and FIG. 3 is a detailed view of the bellows arrangement employed in the device.

DESCRIPTION

Describing the invention in detail and directing attention to FIG. 1, the numeral 10 indicates an outer housing which may be a wall of vacuum Dewar, having disposed therein an internal thin walled cylinder 12 with a cap 14 at one end thereof. An insulating spacer, indicated generally at 16, is positioned within the housing 10 at the end opposite the cap 14. The spacer 16 properly positions the cylinder 12 within housing 10. The housing 10 and cylinder 12 are spaced from each other and are interconnected by a spirally wound tubing 18 which enters the housing 10 as shown at 20 and spirals around the cylinder 12 and in intimate engagement therewith. The tubing 18 is provided with a terminal point 22 disposed within chamber 24, said terminal point 22 being crimp sealed to close the tubing. A section of the tubing 26 adjacent the terminal point 22 is provided with a minute orifice or opening 28 as shown in detail in FIG. 2. In addition, it will be apparent from the structure shown in FIG. 1a that the tubing 18 is provided with a plurality of fins spaced along its longitudinal axis which increases the thermal conducting area thereof. Fiber threads 30, 30 are wound around the fins of the spiral tubing to maximize the physical contact of the escaping gas with the fins and tubing as will hereinafter be explained in more detail.

Directing attention to FIGS. 1 and 3, it will be seen that the inner cylinder 12 contains a bellows-housing member 32 which includes an end cap 34 threadably connected to the housing member 32 as at 36. The end cap 34 supports a bellows 38 which is disposed within cavity 40 of the support member 32. The closed end of the bellows 38 may push against a disc 42 which has a boss 44 thereon to which is conventionally affixed one end of rod valve member 46. The bellows, however, is not secured to the disc 42. The rod valve member 46 has a U-shaped point element secured thereto, said element being indicated by the numeral 48. The point 50 of element 48 is in operative alignment with the opening 28 in the delivery tube 18 as is shown in FIG. 2. A fill tube 52 extends through cap 34 and communicates with the internal aspect of bellows 38. The disc 42 is in abuttable alignment with a shoulder 54 of member 32 which limits the expansion of bellows 38 in a leftward direction as is shown in FIG. 3. A further cavity 56 is provided in member 32 and has disposed therein a coiled spring 58 which is in pressured engagement between the end disc 42 and the wall 60 of member 32.

The body 32 is provided with a sealing bellows 62 secured to a shoulder 64 at the left-hand aspect of the body. The bellows 62 extends leftwardly and is secured to a seal device 66 which has a closed passage 68 to accommodate the exit of rod 46. The bellows 62 is, of course, movable with rod 46. The sealing bellows 62 prevents the entrance of foreign material into the internal aspects of the body 32 and thereby aids in preventing jamming and the like.

During assembly, the fill tube 52 is placed to extend through the element 34 and provide an open end internally of the bellows 38. The fill tube is used to dispose an appropriate amount of fluid, such as argon or nitrogen, within the bellows 38. The total volume of fluid disposed therein will vary depending upon the cryogenic temperature level desired to be maintained. It is noted, however, that at cryogenic temperature levels below, say for example, 100°-110° Kelvin range, a wide variety of pressures and volumes of gases in the bellows 38 may be used and still achieve effective temperature control. Thus, the fill density of the bellows 38 is not a critical item; for example, it could range from 235 p.s.i.a. at 25° C. with a volume of 1,500 ccs per mole of argon to a fill volume of 1,140 p.s.i.a. at 25° C. with a fill volume of 300 ccs per mole. Where the device is intended to operate in the noted cryogenic range, that is, below 100°-110° Kelvin, the temperature pressure curve for both of the illustrated fill volumes is congruent, that is, identical.

In operation it will be understood that the entire arrangement may be placed in a conventional vacuum Dewar, not shown, for insulation purposes. A heat load 75 is mounted on wall 74 immediately adjacent the orifice or port 28 of the cryogen feed line 18. The heat load 75 may be an infrared detector. When the entire arrangement is at ambient temperature, that is, in its quiescent condition, no cryogen is delivered to line 20. When it is decided to actuate the system, cryogen is delivered to the feed line 20 and consequently to the line 18. At ambient temperature, the cryogen in the bellows 38 is in a gaseous state and expands the bellows until it abuts the shoulder 54. In this condition, of course, the tip 50 is out of registry with port 28 and consequently the port is open. Thus a relatively large volume flow of high-velocity gas impinges on wall 74 that is directly at the point of heat load. As the cryogen is delivered by line 18 to the orifice, it escapes into chamber 24, expands and creates a cooling effect on wall 74 and load 75. Cryogen leaves the chamber 24 and travels to the rear aspect of the cryostat via passage 78 which is defined by the inner cylinder 12 and the outer housing 10. Of course, the finned delivery tubing 18 is disposed in the same passage and consequently as the expanded and cooled cryogen moves to the rear, it comes into physical contact with the tubing 18 and its fins, absorbing heat therefrom and therefore acting as a heat exchanger to precool the cryogen being fed through delivery tube 18. As cooling progresses, an ambient temperature condition is created in the cryostat and especially in the housing 32 which approaches a desired set temperature level and the cryogen within the bellows, and the bellows 38, contracts because of the reduced temperature, allowing the spring 58 to bias the arm 46 to the right, thereby bringing the point 50 of arm 46 into registry with the orifice or port 28 closing same. As the ambient temperature condition changes slightly in a warming direction, pressure is built up in bellows 38 which acts against the biasing action of spring 58 to move the point 50 to the left thereby accommodating a bleeding of cryogen into the chamber 24. The bleeding of the cryogen into chamber 24 increases the cooling effect and reduces the ambient temperature condition and the bellows contracts, closing the orifice 28. This opening and closing of the orifice 28, as ambient temperature varies slightly, is repetitive and thus the device provides successive bursts of cooling and expansion of the cryogen gas maintaining the heat load 75 at the desired temperature level over an extended period of time. Under some operating conditions, the bleeding flow is smooth and continuous rather than an on/off action. It should be particularly noted that the controlling bellows 38 is spaced slightly from the chamber 24 and heat load 75, the locale of maximum cooling. Thus the ambient temperature condition at the bellows varies before there is a variation in temperature at the load 75. Thus the flow of cryogen anticipates temperature variation at the load assuring more uniform load temperature control.

Thus it will be seen it is characteristic of this particular cryostat arrangement that it does in fact provide an extremely sensitive bleeding flow control arrangement which responds rapidly to minor and small variations in temperature in the ambient condition, effectively bleeds or expands enough cryogen to accomplish the temperature correction without waste and thus provides effective temperature control over extended periods of time as compared to the operating lives of prior art arrangement.

The invention as shown is by way of illustration and not limitation and may be modified in many respects all within the spirit and scope thereof.

What is claimed is:

1. A valve arrangement to bleed a cryogenic fluid to an expansion chamber to achieve cooling in the expansion chamber;

a hollow valve body having an expansion chamber therein;

a cryogen delivery line extending to the expansion chamber, said cryogen delivery line comprising a tube having outwardly directed fins thereon over at least a substantial portion of its length, a housing member, the tubing being disposed in a space between said housing member and said hollow valve body and extending in spiral configuration from one end of said housing to the other end of said housing adjacent said expansion chamber;

the end of said delivery line being positioned in said expansion chamber and being closed, a pinhole cryogen escape port in the side of said delivery line adjacent the wall of said expansion chamber;

a port closure element in operative alignment with said port, said closure element including an arm extending from a pointed tip on the closure element in alignment with the port;

means to induce relative movement between the element and the port, and thereby accommodate bleeding flow of the cryogen into the expansion chamber to induce cooling so that the expanding cryogen directly impinges upon the wall of the chamber, the movement induced by said inducing means being responsive to variations in ambient temperature condition of the valve arrangement, said inducing means comprising a sealed bellows carried by the valve arrangement internally of said spiral delivery tube and having a cryogenic fluid disposed therein, said closure element being connected to said bellows;

flexure means to bias the bellows and the closure element in a direction to bring the element into closed relationship with the port;

another bellows secured to said first-mentioned bellows to seal said connection between said arm and said first bellows and said first mentioned bellows from ambient;

the cryogenic fluid in the bellows being adapted to expand in response to a rise in ambient temperature from the predetermined level and induce compression of said flexure means and thereby move the pointed tip of the closure element out of port closing relationship, thereby permitting bleeding flow of the cryogenics fluid.

2. A valve arrangement for bleeding a cryogenic fluid to an expansion chamber to achieve cooling by means of a Joule-Thomson effect;

a hollow outer valve body defining an expansion chamber in one end thereof;

an inner hollow support body positioned within said outer body and defining an annular space therearound with the inner surface of said outer body;

a cryogen delivery tube disposed in the annular space between said bodies, said cryogen delivery tube comprising a central tube having a plurality of outwardly extending fins over at least a major portion of the length thereof, said cryogen delivery line extending to the expansion chamber within said valve body;

a wall of said expansion chamber being thermally connected to a heat load;

a fluid escape port in said cryogen delivery line, from which cryogen escapes and expands into the chamber so that the expanded cryogenic fluid impinges on said wall effecting cooling of the heat load;

said cryogen delivery line within said expansion chamber being secured with respect to said support body;

an orifice closure member in operative alignment with said cryogenic fluid escape port;

means to move the port closure member into and out of port closure position to thereby control bleeding flow of the cryogenic fluid into the expansion chamber to induce cooling, said means to move the cryogenic port closure member comprising a sealed bellows carried by the inner body internally thereof and having the same type of cryogenic fluid disposed therein as is being delivered to the expansion chamber, said port closure member being connected to said bellows for movement therewith, spring means carried by the inner body and compressively interposed between the body and the bellows to normally bias the bellows in a direction bringing the port closure member into closed relation with the port;

a secondary bellows mounted on the body and accommodating the entrance of the closure member to the first mentioned bellows for connection therewith, said secondary bellows being movable with respect to the closure element and being further adapted to seal the first mentioned bellows from ambient;

the cryogenic fluid in the first-mentioned bellows being adapted to expand in response to a rise from ambient temperature from a predetermined level and induce compression of said spring means thereby moving the closure member out of closed relation with the port and accommodating bleeding flow of cryogenic fluid to the chamber.

3. A temperature control valve mounted in a cryostat comprising an annular space having a spirally wound finned cryogen delivery tube therein, the cryogen delivery tube having an ambient end which is arranged to receive pressurized gaseous cryogen and an outlet end having an opening therein, said cryostat having a wall defining a thermal load, said wall forming one wall of an expansion chamber, said expansion chamber being open to the finned side of said delivery tube so that expanded cryogen passes said delivery tube and cools the cryogen moving therein to the opening, the improvement comprising:

a cryogen pressurized bellows positioned within said cryostat, interiorly of said annular space, and in thermal communication with expanded cryogen moving from said expansion chamber past said finned tubing, said bellows having a first end fixed in said cryostat and a second end movable with respect thereto, stop means in said cryostat and on said movable end of said bellows, said stop means being in engagement with each other at temperatures above cryogenic temperature for limiting bellows movement, spring means engaged with said movable end of said bellows urging said stop means apart;

said opening in said delivery tube being smaller than the interior bore of said delivery tube and being positioned in the side of said delivery tube and being directed toward said wall in said expansion chamber, said opening forming an expansion orifice for pressurized cryogen, a valve pin positioned to move in throttling relationship with said cryogen expansion orifice, said orifice and said valve pin comprising valve members, one of said valve members being secured to said expansion chamber and the other of said valve members being secured to said movable end of said bellows, said valve members being positioned so that said orifice remains at a fixed throttle opening as the cryostat cools from room temperature substantially down to the cryogenic operating temperature at which temperature said spring moves said movable ends of said bellows away from said stop means to move said valve members together to reduce cryogenic fluid flow out of said orifice opening.

* * * * *